United States Patent
Summers et al.

(10) Patent No.: US 8,550,572 B2
(45) Date of Patent: Oct. 8, 2013

(54) ELECTROMECHANICAL BRAKE SYSTEM WITH DISTRIBUTED ARCHITECTURE

(75) Inventors: Paul L. Summers, Troy, OH (US); Staffan Erickson, Yellow Spring, OH (US); Thomas E. Clary, Tipp City, OH (US); Harald Klode, Centerville, OH (US)

(73) Assignee: Goodrich Corporation, Charlotte, NC (US)

( * ) Notice: Subject to any disclaimer, the term of this patent is extended or adjusted under 35 U.S.C. 154(b) by 918 days.

(21) Appl. No.: 12/434,823

(22) Filed: May 4, 2009

(65) Prior Publication Data
US 2009/0278401 A1 Nov. 12, 2009

Related U.S. Application Data

(60) Provisional application No. 61/051,135, filed on May 7, 2008.

(51) Int. Cl.
*B60T 13/74* (2006.01)

(52) U.S. Cl.
USPC .......................................... 303/20; 188/158

(58) Field of Classification Search
USPC ............ 303/20, 126, 199; 188/158, 159, 161; 244/111
See application file for complete search history.

(56) References Cited

U.S. PATENT DOCUMENTS

| | | | |
|---|---|---|---|
| 6,296,325 B1 | 10/2001 | Corio et al. | |
| 6,345,225 B1 | 2/2002 | Bohm et al. | |
| 6,402,259 B2 | 6/2002 | Corio et al. | |
| 6,954,692 B2 * | 10/2005 | Dellac et al. | 188/156 |
| 7,489,996 B2 * | 2/2009 | Gowan et al. | 701/71 |
| 2003/0083797 A1 * | 5/2003 | Yokoyama et al. | 303/20 |
| 2003/0193240 A1 * | 10/2003 | Lesesky et al. | 303/123 |
| 2005/0110339 A1 * | 5/2005 | Kolberg | 303/20 |
| 2005/0161298 A1 * | 7/2005 | Nilsson et al. | 188/290 |
| 2006/0108864 A1 * | 5/2006 | Evans et al. | 303/126 |
| 2009/0276133 A1 * | 11/2009 | May et al. | 701/75 |

OTHER PUBLICATIONS

Examination Report dated Oct. 3, 2011 in Application No. GB0907696.9.

* cited by examiner

*Primary Examiner* — Thomas J Williams
(74) *Attorney, Agent, or Firm* — Snell & Wilmer L.L.P.

(57) ABSTRACT

A brake system of a vehicle includes a plurality of electromechanical brake actuators (EBAs) proximate the wheels of the vehicle. Each EBA includes a power device for effectuating braking of an associated wheel, and electronics to generate a drive signal for the power device. The brake system may further include at least one brake control unit (BCU) for converting a brake command signal into a control signal for each EBA. The electronics for each EBA may be configured to convert the corresponding control signal into the drive signal that is applied to the power device to cause movement of the power device and effectuate braking of the vehicle.

15 Claims, 3 Drawing Sheets

ELECTROMECHANICAL BRAKE SYSTEM WITH DISTRIBUTED ARCHITECTURE

CROSS-REFERENCE TO RELATED APPLICATIONS

This application claims priority to U.S. Provisional Ser. No. 61/051,135 filed on May 7, 2008, entitled Electromechanical Brake System with Distributed Architecture, which is hereby incorporated by reference.

FIELD OF INVENTION

This invention relates generally to brake systems for vehicles, and more particularly, to an electromechanical braking system for use in stopping an aircraft.

BACKGROUND OF THE INVENTION

Various types of braking systems are known. For example, hydraulic, pneumatic and electromechanical braking systems have been developed for different applications.

An aircraft presents unique operational and safety issues. As an example, uncommanded braking due to failure can be catastrophic to an aircraft during takeoff. On the other hand, it is desirable to have virtually fail-proof braking available when needed (e.g., during landing).

Furthermore, with respect to landing gear and braking systems, the environmental operating conditions may be severe. For example, these systems may be subjected to extreme and rapidly changing temperatures, for example, ranging between approximately −60° C. and 120° C. Such extreme temperature variations present difficulties in developing these systems.

In order to address such issues, various levels of redundancy have been introduced into aircraft brake control architectures. In the case of electromechanical braking systems, redundant powers sources, brake system controllers, electromechanical actuator controllers, and the like have been used in attempts to provide satisfactory braking, even in the event of a system failure.

In this regard, to effectuate braking, each wheel of the aircraft may be associated with multiple electromechanical brake actuators (EBAs) that each apply mechanical force to a brake stack associated with the wheel. Each EBA is driven with a drive signal that is generated specifically for that EBA. In these systems, high level brake commands are generated by one or more brake control units (BCUs), also referred to as a brake system control unit (BSCU). The signals from the BCU are converted into drive signals for each EBA by one or more electromechanical actuator controllers (EMACs). The EMACs consolidate control over EBAs in an area of the aircraft that is remote from the EBAs.

This architecture means that heavy gauge cables are used to carry high voltage drive signals from the EMACs to the EBAs, which can be a distance of fifty feet or more. The number of conductors can be very large (e.g., upward of about 60 conductors per wheel having four EBAs), leading to a significant amount of wire weight. The long drive distance creates significant series wire resistance, causing efficiency loss.

Further, the drive signals are modulated high-voltage power signals and are a source of significant electromagnetic interference (EMI) emission, particularly over the long drive distance the signals travel. Thus, the corresponding cables may be shielded to minimize their effect on other systems, though the shielding detrimentally results in additional weight.

Alternatively, the EMAC devices have been moved from the body of the aircraft to the landing gear. Though this embodiment benefits from wire weight reduction, it is still non-optimal, at least partially because EMI and electrical noise issues are still present. Additionally, the EMACs are large in size, which is generally viewed negatively by aircraft manufacturers and integrators. Furthermore, the extreme operating temperatures at the landing gear present design and operational difficulties.

Accordingly, a need exists for systems and methods for improved electromechanical braking for aircraft.

SUMMARY OF THE INVENTION

In an embodiment, a brake system for a vehicle (e.g., aircraft) includes a plurality of electromechanical brake actuators (EBAs) proximate the wheels of the vehicle. Each EBA includes a power device for effectuating braking of an associated wheel, and electronics to generate a drive signal for the power device. The brake system may further include at least one brake control unit (BCU) for converting a brake command signal into a control signal for each EBA. The electronics for each EBA may be configured to convert the corresponding control signal into the drive signal that is applied to the power device to cause movement of the power device and effectuate braking of the vehicle.

In an embodiment, a first EBA may be configured to communicate with a first BCU through at least one remote data concentrator (RDC). The first EBA may be configured to communicate over a direct network interface with the first BCU. A first drive control signal may be individualized for controlling the first EBA. The first EBA may be configured to receive power used to generate the first drive signal from a power bus associated with the first EBA, and the power bus may be configured to deliver voltage on a single conductor to facilitate powering the first EBA and a second EBA. In an embodiment, the brake system does not include an intermediate controller between the first BCU and the first EBA.

Further, in various embodiments, the electronics may include first EBA control electronics and first EBA drive electronics for the first power device. The first EBA control electronics may be configured to communicate with the second EBA control electronics of a second EBA to coordinate braking of the vehicle Additionally, in accordance with an embodiment, the first EBA may include a sensor interface to receive sensor data from at least one associated sensor, and the first EBA may be configured to transmit the sensor data to the first BCU. Further, the first EBA may be configured to concentrate sensor data from a plurality of sensors for transmission to the first BCU, and the first EBA may be configured to concentrate the sensor data with data regarding operation of the first EBA for transmission to the first BCU. The sensor data may be configured to be transmitted to the first BCU through an RDC, and the first EBA may be configured to communicate wirelessly with at least one of the first BCU, the RDC, and the associated sensor.

In accordance with an embodiment, the brake system may further comprise a second EBA proximate a second wheel of the vehicle, where the second EBA may include a second power device configured to effectuate braking of the second wheel. The second EBA may further include second electronics to generate a second drive signal for the second power device. The brake system may further comprise a second BCU for converting the brake command signal into a second EBA control signal for the second EBA. The second electronics may be configured to convert the second EBA control signal into the second drive signal that is applied to the second power device to effectuate the braking of the second wheel.

Various embodiments of the brake system may further comprise a third EBA proximate the first wheel of the vehicle to facilitate the braking of the first wheel. The third EBA may be configured to receive a third EBA control signal from both the first BCU and the second BCU to facilitate the braking of the first wheel, and the second BCU may be configured to receive the second EBA control signal from both the first BCU and the second BCU. The first, second, and third EBAs may be configured to communicate with any one or more of the other EBAs and/or the first or second BCUs.

In an embodiment, the first EBA is configured to receive power from a bus in a signal that is not modulated. The first drive signal may then be modulated by the first electronics in the first EBA to facilitate driving the power device.

To the accomplishment of the foregoing and related ends, the various embodiments of the electromechanical brake system comprise the features hereinafter described and particularly pointed out in the claims. The following description and the annexed drawings set forth in detail certain illustrative embodiments of the disclosure. These embodiments are indicative, however, of but a few of the various ways in which the principles disclosed herein may be employed. Other objects, advantages and novel features will become apparent from the following detailed description when considered in conjunction with the drawings.

DETAILED DESCRIPTION

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Various embodiments of the disclosed system will now be described with reference to the appended figures, in which like reference labels are used to refer to like components throughout. According to various embodiments, a braking system for a vehicle disclosed herein comprises EBAs that are located proximate the wheels of the vehicle, and the EBAs are configured to perform various functions previously carried out remotely by components of other braking systems. Carrying out various functions locally within the EBAs provides many advantages over existing braking system, for example, local functionality facilitates reducing wire weight associated with communications between prior remote components.

Further, local functionality within the EBAs facilitates reducing EMI because power signal modulation may occur within the EBAs, substantially reducing the distance over which such modulated signals previously traveled. It should be understood that systems according to various embodiments disclosed herein may be incorporated into anything needing a brake or having a wheel, or into any vehicle such as, for example, an aircraft, a train, a bus, an automobile and the like.

Figure 1:
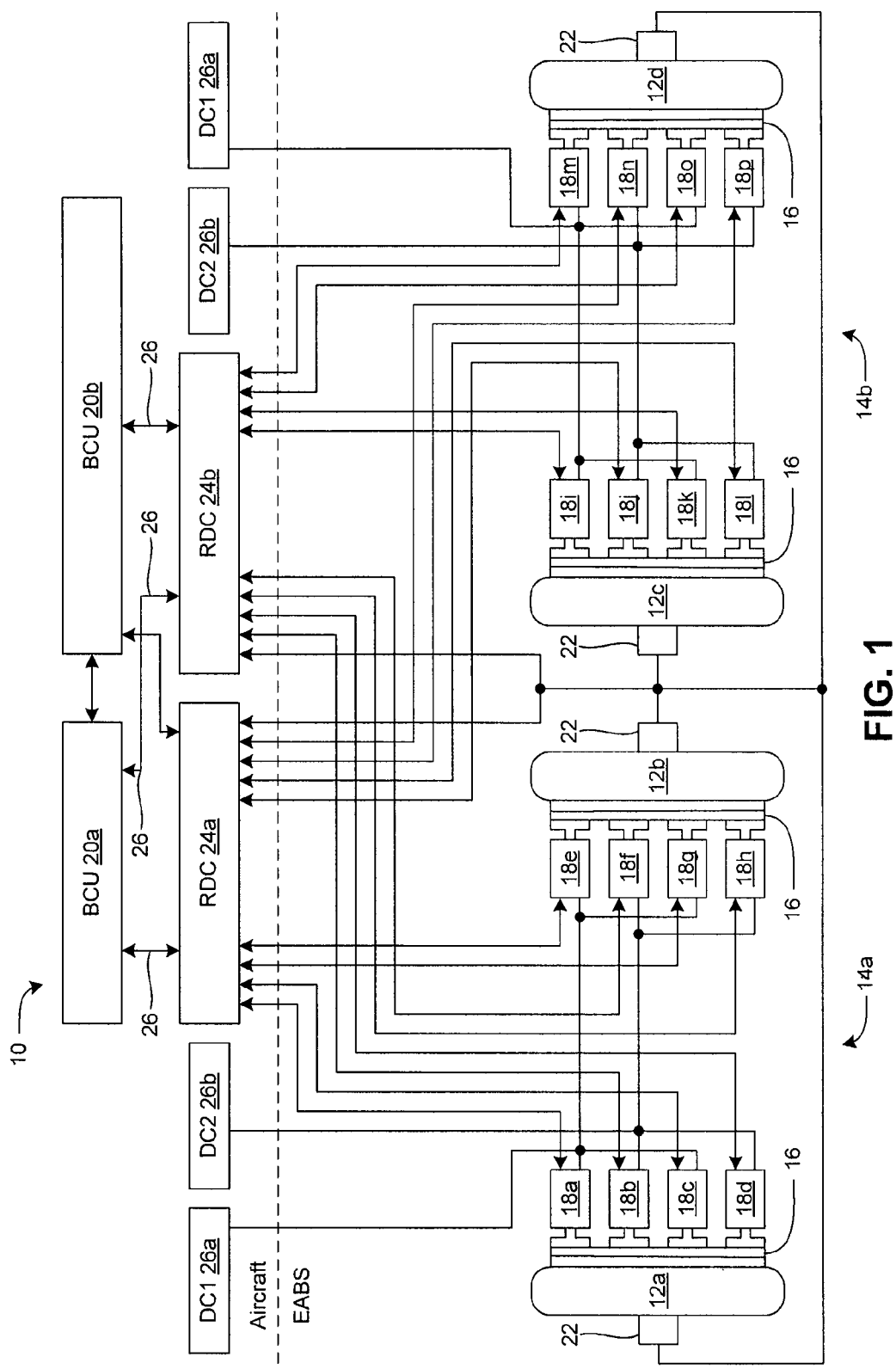
FIG. 1 is a schematic block diagram of an aircraft brake control architecture for an aircraft having four braked wheels in accordance with an embodiment.

For example, referring to FIG. 1, an embodiment of braking system 10 for an aircraft is illustrated. The embodiment of braking system 10 is illustrated as providing braking with respect to four wheels 12, of which two wheels 12a and 12b are mounted to a left landing gear truck 14a of an aircraft and two wheels 12c and 12d are mounted to a right landing gear truck 14b of the aircraft. Each wheel 12 has a brake stack assembly 16. Braking force is applied to the brake stack assembly 14 using electromechanical actuators (EBAs) 18. In the illustrated embodiment, each wheel 10 is associated with four EBAs 18. A first wheel 12a is associated with EBAs 18a-18d, a second wheel 12b is associated with EBAs 18e-18h, a third wheel 12c is associated with EBAs 18i-18l, and a fourth wheel 12d is associated with EBAs 18m-18p.

It will be appreciated that various embodiments of the disclosed braking system 10 may be extended to aircraft that include any number of wheels 12, any number of landing gear trucks 14, any number of axles per truck, any number of EBAs 18, etc.

With continued reference to FIG. 1 and in accordance with various embodiments, the braking system may include at least one upper level controller, or brake control unit (BCU) 20, for providing overall control of the braking system 10. In an embodiment of braking system 10, for example such as illustrated in FIG. 1, may comprise a first BCU 20a and a second BCU 20b. Additionally, two or more BCUs 20 may be present to provide redundancy to braking system 10.

In accordance with various embodiments, the BCUs 20 may receive an input brake command indicative of a desired amount of braking. For example, the input brake command may be derived from brake pedals within the cockpit of the aircraft and may indicate a degree to which the brake pedals are depressed. The input brake command may thus indicate a desired amount of braking. Based on such input, the BCUs 20 may derive an output command signal for each EBA 18 in the form of a drive control signal. Collectively, the drive control signals may effectuate the desired amount of braking in relation to the input brake command and data from sensors 22 that are associated with each wheel 12 and/or each EBA 18. The sensors 22 will be described in greater detail below and, for each wheel, may include, for example, a brake temperature monitoring system (BTMS), a tire pressure monitoring system (TPMS), a wheel speed sensor (WSS), an applied torque sensor (ATS), a wear pin monitoring system (WPMS), a wheel & gear vibration monitoring system (WGVMS), a force/pressure sensor (e.g., a load cell), etc. The force/pressure sensor may form part of the EBA 18.

As noted above, in conventional electromechanical brake systems, the output of the BCU may be in the form of output command signals that, in effect, are indicative of a brake clamp force that is called for by the input brake command. These signals may be input to one or more electromechanical actuator controllers (EMACs) that convert the command signals from the BCU into individual drive control signals for the EBAs. Drivers within the EMACs convert the drive control signals into drive signals that are respectively applied to the EBAs. The drive signal for an individual EBA drives a motor within the EBA to position an actuator of the EBA. The motor may be driven to advance the actuator for the application of force to the brake stack or to retract the actuator to reduce and/or cease the application of force to the brake stack.

In various embodiments of the present disclosure, EMACs may not be present. Rather, drive control signals may be distributed directly from the BCUs 20 to the EBAs 18 without intervening control components. As will be described, the result is a distributed control architecture to implement braking of the aircraft. To implement the distributed architecture, the EBAs 18 may each include control electronics and a driver (e.g., driver electronics) for converting the input drive control signal into a drive signal that is applied to the motor of the EBA 18. The operation of such control electronics and drivers may be controlled by software in conjunction with a processor and/or by standard electronics components. Additional details of the EBAs 18 will be described in greater detail below.

Further, in accordance with various embodiments, the drive control signals from the BCUs 20 may be directed to the EBAs 18 through a network of the aircraft. For example, as illustrated in FIG. 1, signals may be exchanged between the BCUs 20 and the EBAs 18 through remote data concentrators (RDCs) 24. Two RDCs 24a and 24b may be present so as to provide redundancy to the communications pathway between the BCUs 20 and the EBAs 18. Signals between the RDCs 24 and the BCUs 20 may be communicated over corresponding high-speed serial (HSS) links 26 or some other type of link. The communication links between the RDCs 24 and the EBAs 18 may be implemented using HSS links, low-speed serial (LSS) links, or some other type of link, such as an integrated modulation avionics (IMA) architecture over a switched transmit/receive protocol (e.g., avionics full duplex Ethernet (AFDX)). It should be noted that in various embodiments, the BCUs 20 may be configured to communicate directly with the EBAs 18 without intervening RDCs 24.

With continued reference to the embodiment illustrated in FIG. 1, the communication pathways between the EBAs 18 and the first and second RDCs 24 may be arranged so that no one RDC 24 communicates with all of the EBAs 18 associated with a single wheel 12. In this respect, the first RDC 24a communicates with EBAs 18a, 18c, 18e and 18g of the left truck 14a and with EBAs 18j, 18l, 18n and 18p of the right truck 14b. The second RDC 24b communicates with EBAs 18b, 18d, 18f and 18h of the left truck 14a and with EBAs 18i, 18k, 18m and 18o of the right truck 14b.

In various embodiments, each individual EBA 18 may communicate with each RDC 24 so that there is redundant communication pathways back to the BCUs 20. Further, in various embodiments, the first RDC 24a may communicate with all of the EBAs 18 of certain wheels 12, such as the wheels 12a and 12d and the second RDC 24b may communicate with all of the EBAs 18 of the remaining wheels 12, such as wheels 12b and 12c. As will be appreciated, other arrangements for the communication links between the RDCs 24 and the EBAs 18 may be made.

It also will be appreciated that other network implementations are possible in accordance with various embodiments. For instance, the RDCs 24 may be omitted and the EBAs 18 may interface more directly with the BCUs 20, such as over HSS links (e.g. an HSS network arranged in daisy chain fashion or in a star network approach) or some other type of communication links. As discussed further below, any type of wireless or wired network may be used for communication between BCUs 20, EBAs 18, and/or RDCs 24. In various embodiments, fiber optic networks may be utilized. Further, in various embodiments, combinations of different types of networks may be used to facilitate communications between the various devices in the braking system.

Various embodiments comprise sensors 22 that may be configured to communicate with the BCUs 20. Sensors 22 may transmit output sensor data to the BCUs 20 and/or the EBAs 18 directly and/or via the RDCs 24. In FIG. 1, for example, the sensors 22 are illustrated as having a grouped connection to the RDCs 24. It should be understood that showing the data pathways in this manner is merely representative. For instance, in various embodiments, each sensor 22 may have an independent communication link with one or more RDCs 24 or some other point in the system 10 (e.g., one or more of the BCUs 20 and/or one or more of the EBAs 18). In an embodiment, the communication link between any specific sensor 22 and any other point may include a wired connection with a dedicated set of conductors. In various embodiments, shared conductors also may be used. Further, in various embodiments, any type of wired or wireless communication network or device may be utilized for communications between the EBAs 18, the BCUs 20, and/or the RDCs 24.

In accordance with various embodiments, and as more fully described below, the communication link between any specific sensor 22 and any other point may be a wireless connection. Exemplary wireless connections include, but are not limited to, Bluetooth, WiFi, WiMAX, near field communication (NFC), and radio frequency identification (RFiD). Further, the communication link between sensors 22 and any other point may be via a fiber optic cable.

Also, in connection with various embodiments, the devices at the landing gear (e.g., the sensors 22 and EBAs 18) may communicate directly with the BCUs 20 or may communicate via a community network, such as that implemented with the RDCs 24. Grouping the communications of the sensors 22 and/or the EBAs 18 through an RDC 24 or similar device may reduce the number of conductors and, therefore, reduce wire weight. In various embodiments, the RDCs may be placed relative to the landing gear, such as near the top of the landing gear strut(s) or near the wheels 12. Placement of the RDCs 24 in this manner may be used to maximize a length of the cable(s) from the RDCs 24 to the BCUs 20. Additionally, the RDCs 24 may include one or more wireless transceivers to interface with corresponding wireless transceivers in the sensors 22 and/or the EBAs 18, thereby reducing reliance on wired connections. The RDCs 24 may act to group and packetize data and messages from the EBAs 18 and sensors 22 onto the network between the RDCs 24 and the BCUs 20, which may yield an increase in system 10 performance. RDCs 24 located at the landing gear also may allow system expansion by facilitating "patching in" of new components into the community network. According to an embodiment, at least one RDC 24 is included per wheel 12 where the RDC 24 supports the sensors 22 and EBAs 18 that are associated with the wheel 12.

EBAs 18 have been known to output regenerative electrical energy during retraction. In various embodiments, the RDCs 24 and/or the EBAs 18 may be configured to contain the regenerative energy. For instance, capacitors may be used to store the regenerative energy and limit upstream power transmission. Also, diodes may be used to limit upstream power transmission, and/or resistors may be used to dissipate the regenerative energy and limit the generated DC voltage.

The EBAs 18, in accordance with various embodiments, receive power from a power source. For example, with continued reference to FIG. 1, some of the EBAs 18 may receive power from a first power bus (DC1) 26a and the remaining EBAs 18 may receive power from a second power bus (DC2) 26b. The power buses 26 may supply relatively high voltage power for use in generation of the drive signals and may supply relatively low voltage power for use in powering the electronics of the EBAs 18. For instance, each power bus 26 may supply 270 VDC and 28 VDC for these purposes. In various embodiments, at least the high-voltage power may be alternating current.

The power required to drive the actuator in each EBA to facilitate providing a braking force for the aircraft wheels is determined when deciding an appropriate EBA for a braking system. Summing the power required for all EBAs in a system provides a gross signal strength to be provided by the power buses. In various embodiments, the gross signal strength may be distributed from the power buses via a fewer number of conductors than the total number of EBAs, thereby reducing the wire weight associated with prior systems. The gross signal may be carried longer distances over the fewer conductors, and the appropriate power may then be provided locally to each individual EBA. For example, a single pair of conductors from the first power bus 26a may be appropriately sized to supply power at a given voltage to a plurality of EBAs 18. In an embodiment, more than one pair of conductors may be used.

Further, in various embodiments, the power supply connections may be arranged so that no one power bus 26 supplies power to all of the EBAs 18 associated with a single wheel 12. In FIG. 1, for example, the first power bus 26a supplies power to EBAs 18a, 18c, 18e and 18g of the left truck 14a and to EBAs 18i, 18k, 18m and 18o of the right truck 14b. The second power bus 26b supplies power to EBAs 18b, 18d, 18f and 18h of the left truck 14a and to EBAs 18j, 18l, 18n and 18p of the right truck 14b. As will be appreciated other arrangements for the supply of power may be made.

With the exception of the wheels 12, a demarcation between components of the aircraft and components of an electrically activated braking system (EABS) portion of the overall braking system 10 is shown using a dashed line in FIG. 1. Cabling from the aircraft to supply power and drive control signals to the EBAs 18 may be run down corresponding landing gear struts (not shown). The cables may be bundled in wire harnesses that are arranged such that a failure of one harness will not allow for failure of all EBAs 18 of the associated truck 14. One potential cause of failure of a harness is impact from debris or from a burst tire. The wire harnesses also may include cables to establish communication links between the sensors 22 and upstream devices in the system 10 (e.g., the RDCs 24 and/or the BCUs 20).

As will be appreciated, there is significant control flexibility with the distributed architecture of various embodiments of system 10. The BCUs 20 may have logical control over and access to each EBA 18 via the network infrastructure between the BCUs 20 and the EBAs 18. For instance, the BCUs 20 may send individual and/or broadcast messages to all the EBAs 18 on the network. Also, discrete signals may further include brake enable signals that exercise enable/disable control over the EBAs 18 individually or collectively. In another implementation, control over the presence or absence of high-voltage DC or AC power may be used for EBA 18 enable/disable control.

In various embodiments, the BCUs 20, which are remotely located from the EBAs 18, perform high-level functions and coordination of braking operations, such as electrical power and information management (e.g. voting, data consolidation and storage, power management, etc.), antiskid control, etc. Further, in various embodiments, some system control may be delegated to the EBAs 18, in which case control electronics in the EBAs 18 may communicate with each other to coordinate their efforts to accomplish braking of the aircraft.

The distributed architecture as disclosed herein may reduce system wire weight compared to a conventional implementation using EMACs. In an EMAC-based system, for example, individual discrete wire control of the EBAs is employed, which typically uses upward of about 60 wires per wheel where there are four EBAs per wheel. In various embodiments of the disclosed distributed architecture and where HSS communications to the EBAs 18 is employed, there may be about ten to about twenty wires per wheel 12 where there are four EBAs 18 per wheel 12. By running the HSS serial cables as long a distance as possible (e.g., out of an avionics bay where the BCUs 20 are located, across a fuselage of the aircraft, and down the landing gear) a reduction in system wire weight may be realized. In addition, the conductor cross-section of the power wires that connects the EBAs 18 to the power buses 26 may be reduced compared to wires that conventionally supply drive signals from the EMACs to the EBAs. A conductor cross-section reduction may be realized since the magnitude of the average supply current to the EBAs 18 may be less than the magnitude of the phase currents between the motors of the EBAs 18 and the respective power stage (e.g., an inverter).

In accordance with various embodiments, EMI generation may also be reduced in the disclosed distributed architecture. In general, EMI is generated when a signal is modulated. EMI generation is greater as the distance the modulated signal travels increases. Where modulated drive signals previously traveled from EMACs to EBAs over a certain distance, substantial EMI was generated. However, in accordance with various embodiments disclosed herein, drive signals for the EBAs 18 may be generated at the EBAs 18, and the modulated drive signals may not travel as far. For example, in an embodiment, the modulated drive signal travels only about an inch or less from the point of modulation to the actuator, thereby significantly reducing the generation of EMI.

The distributed architecture of various embodiments of system 10 may integrate control and drive electronics to the EBAs 18. These electronics may be configured to endure the environment of the EBAs 18. EBAs 18 may be in direct contact with a brake actuator plate (not shown). The actuator plate and, hence, the EBAs 18 may be exposed to significant temperature extremes, such as extreme cold during flight and extreme frictionally generated heat during braking. For example, during service landing no melt (SLNM) testing, the radiating brake heat sink energy may cause the EBA 18 internal temperature to reach about 150 degrees Celsius. Positive temperature extremes experienced during typical braking are generally of relatively short duration and may be in the range of about 100 degrees Celsius to about 125 degrees Celsius. Further, the EBAs 18 may be subject to heavy vibration upon aircraft landing and the possibility of a direct lightning hit. Accordingly, various embodiments may comprise EBAs 18 that are configured to operate in a temperature range of about negative 55 degrees Celsius to about positive 150 degrees Celsius, operate subject to high degrees of mechanical vibration, and/or operate in the event of a direct strike from lightning.

Figure 2:
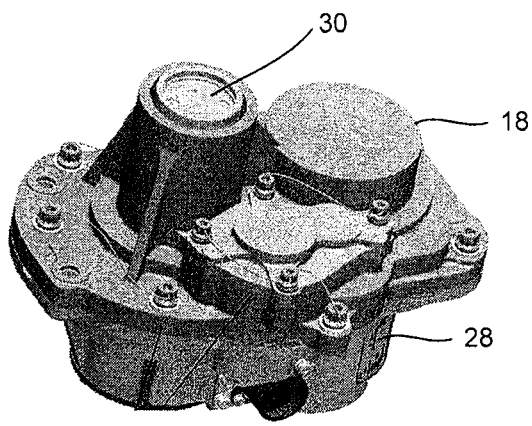
FIG. 2 is a schematic representative view of an electromechanical actuator (EBA) that forms part of the brake control architecture of FIG. 1 in accordance with an embodiment.

With reference to FIG. 2, various embodiments may provide an EBA 18 configured as a modular device that includes a housing 28 in which a motor, gears and any other appropriate mechanical devices are contained. In response to the drive signal, the motor may be configured to move an actuator 30 that, in turn, selectively applies pressure to an actuator plate (not shown) that compresses the brake stack assembly 16 to result in slowing of the associated wheel 12.

Figure 3:
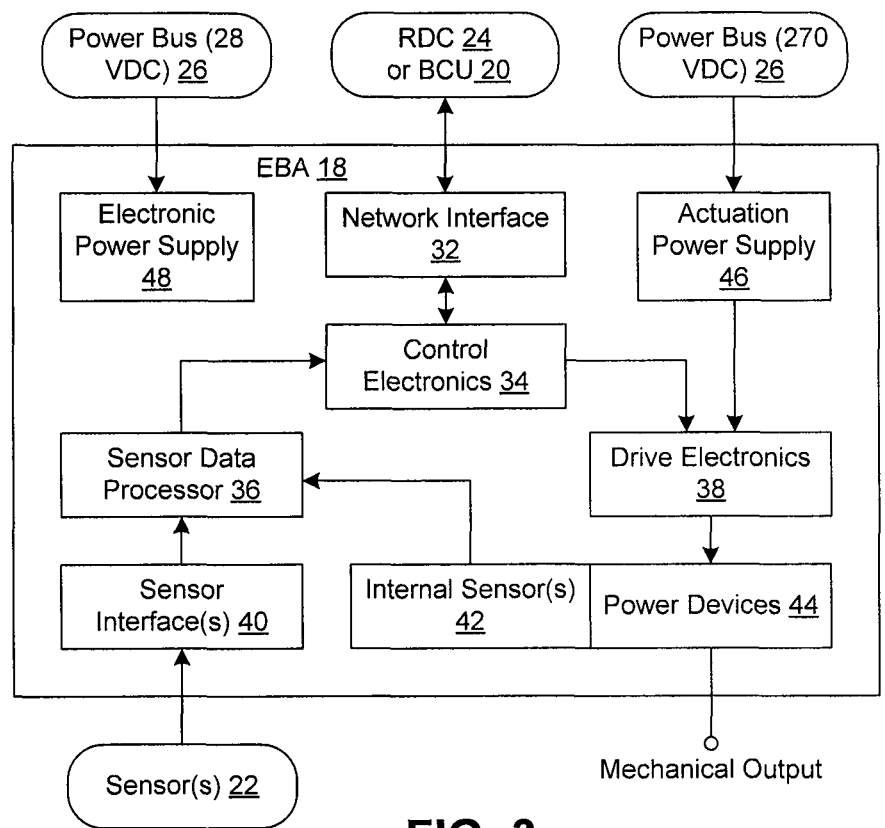
FIG. 3 is a schematic block diagram of the electronics of the EBA of FIG. 1 in accordance with an embodiment.

Housing 28, in accordance with various embodiments, may include electronics, for example as illustrated in FIG. 3. The EBA 18 may include a network interface 32. The network interface 32 may be configured to establish communications with an upstream device, such as one or more of the BCUs 20, and/or one or more of the RDCs 24 in embodiments where the RDCs 24 form part of the system 10. Feedback, sensor data, performance information, health and status information, and so forth may be transmitted upstream using the network interface 32. Further, drive control signals and other commands may be received from the upstream components over the network interface 32.

Received information, drive control signals and commands may be supplied to control electronics 34. The control electronics 34, in conjunction with output data from a sensor data processor 36, may generate command signals that are input to drive electronics 38. Data from sensors 22 that are external to the EBA 18 may be received with one or more sensor interfaces 40 that may be configured to communicate the data to the sensor data processor 36. The sensor data processor 36 may encode the data for use by the control electronics 34, for example. Internal sensors 42, such as a load cell, a motor speed sensor, an actuator position sensor, etc., also may be present. The internal sensors 42 may input data directly to the sensor data processor 36. In other embodiments, sensor data from the external sensor(s) 22 and/or the internal sensor(s) 42 may be input directly to the control electronics 34. Various other sensors and/or components may be utilized in connection with the drive control signals and commands associated with various embodiments of the EBAs 18. For example, a solenoid may be utilized to lock an EBA in response to certain commands.

In accordance with various embodiments, the command signals that are input to the drive electronics 38 may be converted by the drive electronics 38 into a drive signal that is applied to a power device(s) 44 (e.g., the motor). The drive electronics 38 also may be referred to as a driver or as an actuation channel. The power device 44 may be configured to convert the drive signal into a mechanical output (e.g., rotation of the motor that drives a gear train to result in movement of the actuator 30). Generation of the drive signal may include, for example, commutation and voltage switching of a high voltage input from the associated power bus 26. The high voltage side of the corresponding power bus 26 may be coupled to the drive electronics through an actuation power supply 46 or directly input to the drive electronics 38. The various electronic components of the EBA 18 (e.g., the network interface 32, the control electronics 34, the drive electronics 38, the sensor data processor 36, the sensor interface(s) 40 and the internal sensors 42) may receive operating power from the low voltage side of the corresponding power bus 26 through an electronic power supply 48.

Figure 4:
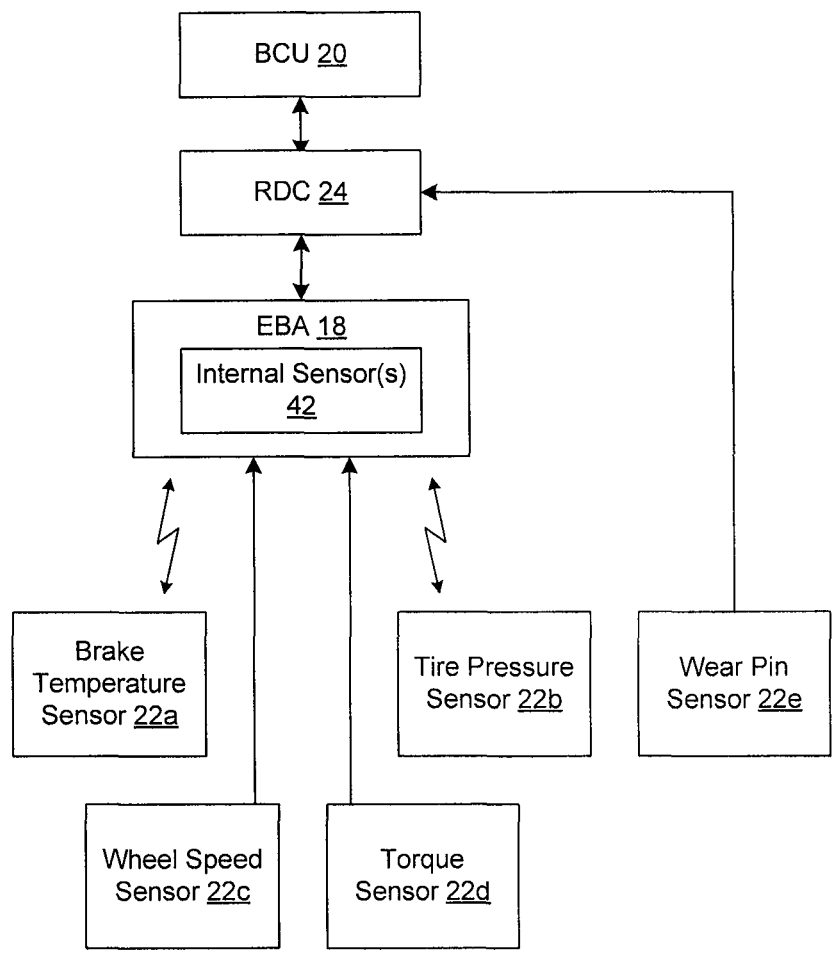
FIG. 4 is a schematic block diagram of system architecture for communicating sensor data to a brake control unit (BCU) that forms part of the brake control architecture of FIG. 1 in accordance with an embodiment.

In accordance with various embodiments, and with reference to FIG. 4, the EBA 20 may function as a medium through which sensor 22 data is passed upward in the system 10.

In the illustrated example, a brake temperature sensor 22a and a tire pressure sensor 22b may be configured to wirelessly communicate sensor data to a corresponding EBA 18. Also, a wheel speed sensor 22c and a torque sensor 22d may be configured to communicate sensor data to the EBA 18 over a wired connection. To this end, the sensor interface(s) 40 of the EBA 18 may include any appropriate wireless transceivers or wired interfaces. The EBA 18 may relay the sensor data from the external sensors 22, together with data from any internal sensors 42, if appropriate, to one or more RDCs 24 and/or more directly to one or more of the BCUs 20. In various embodiments, the EBA 18 may include a data concentrator to group and packetize sensor data for transmission upstream.

Further, in various embodiments, the RDC 24 may be present even if the EBA 18 includes a data concentrator. Also, one or more sensors 22 may bypass the EBA 18 when communicating data upstream. For example, a wear pin sensor 22e is illustrated as communicating data to the RDC 24, but data from any of the sensors 22 may be communicated more directly to one or more of the BCUs 20 (without use of the RDC 24). As previously indicated, communications between one or more of the sensors 22 and the RDC 24 may be made over a wireless link and/or any other type of communications link and/or network as disclosed herein or as developed hereafter.

It should be noted that according to various embodiments, software may be utilized to carry out the various processes, instructions, and interactions disclosed herein. The software may be embodied on a tangible computer readable medium that is configured to store instructions for execution by a computer processor. The instructions, when executed by the computer processor, may be configured to cause the brake system and associated components to operate as disclosed herein. Further, in accordance with various embodiments, standard electronics components may be utilized to cause the brake system and associated components to operate as disclosed herein with or without the use of a computer processor and associated computer readable media.

Although this disclosure illustrates and describes various embodiments, equivalents and modifications will occur to others who are skilled in the art upon reading and understanding of the disclosure. Various embodiments include all such equivalents and modifications, and is limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system, comprising:
a first electromechanical brake actuator (EBA) proximate a first wheel, the first EBA including a first power device configured to effectuate braking of the first wheel, and first electronics to generate a first drive signal for the first power device; and
a first brake control unit (BCU) for converting a brake command signal into a first EBA control signal for the first EBA;
wherein the first electronics in the first EBA are configured to convert the first EBA control signal into the first drive signal that is applied to the first power device to effectuate the braking of the first wheel,
wherein the first EBA is configured to communicate with the first BCU through a remote data concentrator (RDC), and
wherein the RDC is also in communication with a second EBA,
the second EBA proximate a second wheel of an aircraft, the second EBA including a second power device configured to effectuate braking of the second wheel, and second electronics to generate a second drive signal for the second power device; and
a second BCU for converting the brake command signal into a second EBA control signal for the second EBA, wherein the second electronics in the second EBA are configured to convert the second EBA control signal into the second drive signal that is applied to the second power device to effectuate the braking of the second wheel.

2. The brake system of claim 1, wherein the first EBA control signal is individualized for controlling the first EBA.

3. The brake system of claim 1, wherein the first EBA is configured to
receive first drive power used to generate the first drive signal from a power bus associated with the first EBA, wherein a single pair of conductors from the power bus is configured to facilitate delivering the first drive power to the first EBA and second drive power to the second EBA.

4. The brake system of claim 1, wherein the first electronics include first ELIA control electronics and first EBA drive electronics for the first power device.

5. The brake system of claim 4, wherein the first EBA control electronics are configured to communicate with second EBA control electronics of the second EBA to coordinate braking.

6. The brake system of claim 1, wherein the first EBA includes a sensor interface to receive sensor data from an associated sensor.

7. The brake system of claim 6, wherein the first EBA is configured to transmit the sensor data to the first BCU.

8. The brake system of claim 7, wherein the first EBA is configured to concentrate sensor data from a plurality of sensors for transmission to the first BCU.

9. The brake system of claim 8, wherein the first EBA is configured to concentrate the sensor data with data regarding operation of the first EBA for transmission to the first BCU.

10. The brake system of claim 9, wherein the sensor data is configured to be transmitted to the first BCU through the RDC.

11. The brake system of claim 9, wherein first EBA is configured to communicate wirelessly with at least one of the first BCU, the RDC, and the associated sensor.

12. The brake system of claim 1, further comprising a third EBA proximate the first wheel to facilitate the braking of the first wheel, wherein the third EBA is configured to receive a third EBA control signal from both the first BCU and the second BCU to facilitate the braking of the first wheel, and wherein the second EBA is configured to receive the second EBA control signal from both the first BCU and the second BCU.

13. The brake system of claim 12, wherein the first EBA is configured to communicate with the first BCU, the second BCU, the second EBA, and the third EBA, wherein the second EBA is configured to communicate with the first BCU, the second BCU, the first EBA, and the third EBA, and wherein the third EBA is configured to communicate with the first BCU, the second BCU, the first EBA, and the second EBA.

14. The brake system of claim 1, wherein the first EBA is configured to receive power from a bus in a signal that is not modulated, and wherein the first drive signal generated by the first electronics in the first EBA is modulated.

15. The brake system of claim 1, wherein the RDC is disposed on at least one of a landing gear strut and a wheel.

* * * * *